Figure 1:
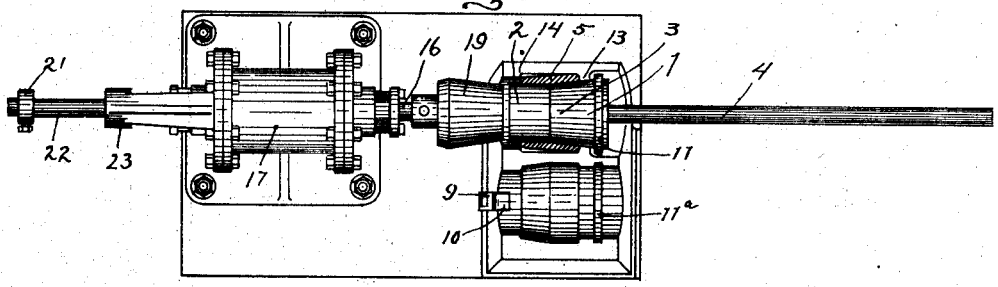

No. 706,520. Patented Aug. 12, 1902.
P. BOYD.
APPARATUS FOR WELDING AND TAPERING SOCKETS.
(Application filed Dec. 21, 1901.)
(No Model.)

Witnesses.
Fred O. Suret
Walter Samaries

Inventor
Peter Boyd
By Kay & Totten
Attorneys.

UNITED STATES PATENT OFFICE.

PETER BOYD, OF PITTSBURG, PENNSYLVANIA, ASSIGNOR TO NATIONAL TUBE COMPANY, OF PITTSBURG, PENNSYLVANIA, A CORPORATION OF NEW JERSEY.

APPARATUS FOR WELDING AND TAPERING SOCKETS.

SPECIFICATION forming part of Letters Patent No. 706,520, dated August 12, 1902.

Application filed December 21, 1901. Serial No. 86,765. (No model.)

*To all whom it may concern:*

Be it known that I, PETER BOYD, a resident of Pittsburg, in the county of Allegheny and State of Pennsylvania, have invented a new and useful Improvement in Apparatus for Welding and Tapering Sockets; and I do hereby declare the following to be a full, clear, and exact description thereof.

My invention relates to apparatus for welding, shaping, and tapering pipe couplings or sockets; and its object is to provide apparatus whereby couplings or sockets can be welded, shaped externally, and tapered internally at both ends at a single heat and with a minimum of operations and handlings.

Pipe couplings or sockets are preferably tapered at both ends where the screw-threads are cut, so that when they are screwed onto a pipe they will form a tight joint therewith. Heretofore it has been the practice to weld and shape such couplings upon a straight mandrel, then strip the same off said mandrel, and after the coupling had cooled taper the same internally at both ends by means of a suitably-shaped reaming or tapping tool. It has also been proposed to weld and shape the couplings upon a straight mandrel, as above described, then strip the same off said mandrel, and at the same heat by means of suitable apparatus or dies forge or expand the ends of the couplings to produce the internal taper. In all methods of manufacture prior to my invention, however, at least three steps or operations were necessary before the coupling was ready for threading—namely, first, welding and shaping on a straight mandrel; second, stripping the welded and shaped coupling off the mandrel, and, third, either at the same heat forging or expanding the ends of the coupling to form the internal taper or after the coupling had cooled reaming out the same internally at both ends. Each additional step or operation in the manufacture of small articles of this character necessitates an additional handling thereof and adds considerably to the cost; but heretofore it has never been found practical to make such couplings with a less number of steps than those enumerated.

It is the object of my invention to provide apparatus for welding and shaping couplings or sockets and tapering the same internally at both ends, whereby the number of steps or operations and handlings are reduced and the cost correspondingly reduced.

To this end it comprises a suitable mandrel having preferably a straight and a tapered portion, or at least a tapered portion, on which the coupling is welded and shaped, together with suitable dies for welding and shaping the coupling on the mandrel, said dies being also provided with an abutment or shoulder against which one end of the coupling may rest and in line therewith a power-actuated plunger having a tapered portion and which is adapted to abut against the mandrel, push it out of the coupling, and simultaneously expand the smaller end of the coupling and taper it internally.

Figure 2:
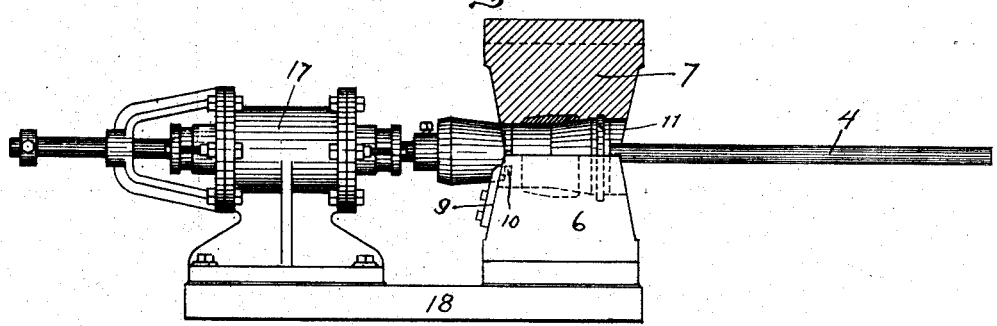
Figure 3:
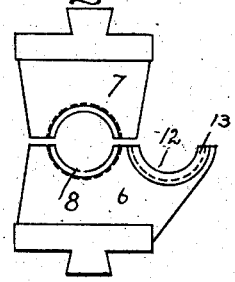
Figure 4:
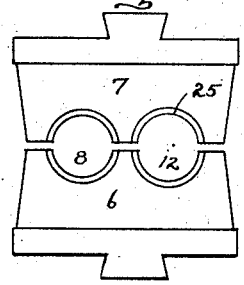
Figure 5:
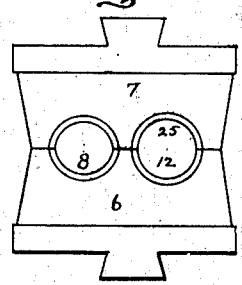
Figure 6:
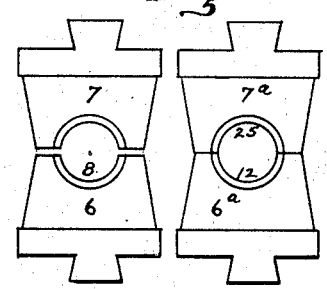

In the accompanying drawings, Figure 1 is a plan view of my apparatus, the top die being omitted. Fig. 2 is a side view thereof, the top die being in section. Fig. 3 is an end view of the dies, and Figs. 4, 5, and 6 are modified forms of dies.

In my apparatus it is essential to have a mandrel 1, which is preferably provided with a straight portion 2 and a tapered portion 3, or at least with a tapered portion, and is also preferably provided with a handle 4, whereby it can be manipulated and carried. The blank 5 having first been bent into form and suitably heated is slipped upon the mandrel, so as to cover substantially equal portions of the straight and tapered portions of the mandrel. In this position it is to be welded and shaped on the mandrel, and for this purpose I provide the anvil-die 6 and the top die 7, each of which is provided with a die-cavity 8, of proper contour to give the desired shape to the exterior of the coupling. The upper die 7 is moved up and down by any suitable mechanism—such, for instance, as a power-cylinder or the like—and thus acts as a hammer to weld and shape the coupling on the mandrel. The mandrel during this operation is preferably rotated by means of its handle 4. To properly position the mandrel with reference to the blank, a suitable gage or stop is employed—such, for instance, as the arm or bracket 9, secured to the anvil-die 6 and having its upper end bent inwardly, as at 10, to form a stop against which the end of the mandrel is adapted to abut; or, if desired, the mandrel may be provided with a suitable shoulder 11, adapted to coöperate with a suitable shoulder or depression 11ª on the dies. The blank 5 will naturally drop into the die-cavities 8, so that by positioning the mandrel with reference to the die it is also positioned properly with reference to the blank, so that a taper of proper length will be formed interiorly at one end of the coupling. When the coupling has been welded, shaped, and tapered on the mandrel 1, the latter, with the coupling thereon, is taken to the stripping mechanism, which comprises suitable shoulders or abutments, against which the tapered end of the coupling will rest, together with a plunger in line therewith. The plunger will force the mandrel out of the coupling and simultaneously expand and taper the other end of the coupling. For this purpose the anvil-die 6 is provided, preferably at one side of the welding-cavity 8, with the stripping-cavity 12, which is provided at its forward end with the shoulder 13, against which the expanded end of the socket is adapted to abut, and at its opposite end with the shoulder 14. In line with this stripping-cavity 12 is the plunger 16, which preferably is power-actuated, and for this purpose I have shown a power-cylinder 17, which is preferably mounted on the same base-plate with the anvil-die 6. The plunger 16 at its forward end is provided with the tapered head 19, which is adapted to contact with the end of the mandrel 1, force it out of the coupling, and expand and taper the rear end thereof. The stripping-cavity 12 is formed to leave a space into which the rear end of the coupling can be expanded to properly taper the rear end thereof and bring said end out into line with the shoulder 14, which will strip the coupling off the plunger as the latter is withdrawn.

To properly taper the coupling, it is essential that the plunger be projected into the coupling to just the right distance and no farther, and for this purpose some stop or gage should be employed to limit the inward movement of said plunger. I have shown for this purpose the collar or ring 21, adjustably secured to the rear end of the piston-rod 22 of the power-cylinder 17, the piston-rod being extended out through the rear head of the cylinder and through the yoke 23, which serves as an abutment against which the collar 21 will strike, and thus stop the forward movement of the plunger.

While stripping and expanding the coupling, the latter will lie in the stripping-cavity 12, and it need not be held therein; but, if desired, the upper die 7 may be enlarged and provided with a cavity 25, (shown in Figs. 4 and 5,) corresponding to the cavity 12 in the anvil-die, so that while stripping and expanding the coupling it will be entirely inclosed.

It is not esssential, however, that the welding cavity and the stripping-cavity be both formed in the same dies, as they may be formed in separate dies, as shown, for instance, in Fig. 6, in which 6 represents the anvil welding-die, and 7 the top welding-die, 6ª an anvil stripping-die, and 7ª the top stripping or holding die.

The operation of the apparatus will be readily understood from the foregoing description and is as follows: The blank 5 having been bent into ring form and properly heated is slipped upon the mandrel 1 and, together with the latter, is placed between the dies 6 and 7, the bracket 9 serving to properly position the mandrel in the dies. The top die is then operated in the usual way, and the mandrel is slowly rotated, whereby the coupling is welded and shaped and at the same time is tapered internally at one end. The top die 7 is then raised and the mandrel, together with the coupling thereon, is lifted over sidewise into the stripping-cavity 12 with the expanded end of the coupling abutting against the shoulder 13. The plunger 16 is then projected by its piston against the mandrel 1, forcing it out of the coupling and then expanding the smaller end of the coupling out into the cavity 12 and tapering it internally. The forward movement of the plunger is limited by the collar 21 coming against the yoke 23, and when said plunger is withdrawn the coupling is stripped off by the shoulder 14.

I have shown the mandrel provided with a straight as well as a tapered portion; but it would be sufficient if it were tapered throughout. In that case the coupling would be tapered from end to end, and the plunger-head 19, when forced into the smaller end thereof, would have to expand it to a greater extent than with the shape shown in the drawings. I prefer to use a mandrel with a straight as well as a tapered portion, but wish it understood that my invention is not limited thereto.

By the use of the apparatus described the coupling is welded, properly shaped, and tapered internally at both ends at a single heat and by practically a continuous operation. The coupling as it leaves the stripping-die is ready for threading.

What I claim as my invention, and desire to secure by Letters Patent, is—

1. In apparatus for welding and tapering pipe couplings or sockets, the combination of a mandrel, and a die having a welding-cavity and a stripping-shoulder independent of said welding-cavity.

2. In apparatus for welding and tapering pipe couplings or sockets, the combination with a mandrel, of a die having a welding-cavity and a stripping-shoulder, and a plunger in line with said stripping-shoulder.

3. In apparatus for welding and tapering pipe couplings or sockets, the combination with a mandrel having a tapered portion, of a die having a welding-cavity and a stripping-shoulder, and a plunger in line with said shoulder, said plunger having a tapered portion.

4. In apparatus for welding and tapering pipe couplings or sockets, the combination with a mandrel, of a die having a welding-cavity and a stripping-shoulder at one side thereof.

5. In apparatus for welding and tapering pipe couplings or sockets, the combination with a mandrel, of a die having a welding-cavity and a stripping-shoulder at the side thereof, and a plunger in line with said stripping-shoulder.

6. In apparatus for welding and tapering pipe couplings or sockets, the combination with a mandrel having a straight and a tapered portion, of a die having a welding-cavity and a stripping-shoulder at the side thereof, and a plunger in line with said stripping-shoulder, said plunger having a tapered portion.

7. In apparatus for welding and tapering pipe couplings or sockets, the combination with a mandrel, of an anvil-die having a welding-cavity and a stripping-shoulder, a top die having a welding-cavity, and a plunger in line with said stripping-shoulder.

8. In apparatus for welding and tapering pipe couplings or sockets, the combination with a mandrel, of an anvil-die having a welding-cavity and a stripping-cavity, a top die having corresponding welding and stripping cavities, and a plunger in line with said stripping-cavity.

9. In apparatus for welding and tapering pipe couplings or sockets, the combination with a mandrel having a tapered portion, of a die having a cavity formed therein provided with a shoulder at its front end, and a power-actuated plunger in line with said cavity and provided with a tapered head.

10. In apparatus for welding and tapering pipe couplings or sockets, the combination with a mandrel, of a die having a welding-cavity and a stripping-shoulder, of a plunger in line with said stripping-shoulder, power mechanism for actuating said plunger, and a stop for limiting the forward movement of said plunger.

11. In apparatus for welding and tapering pipe couplings or sockets, the combination with a mandrel, of a die having a stripping-cavity, of a plunger in line with said stripping-cavity, a power-cylinder for actuating said plunger, the piston-rod of said cylinder extending through the rear head thereof, and a stop on said piston-rod.

12. In apparatus for welding and tapering pipe couplings or sockets, the combination with a mandrel, of a die having a welding-cavity and a stripping-cavity at the side thereof, said stripping-cavity having front and rear shoulders, and a plunger in line with said cavity and adapted to force the mandrel out of the coupling and in turn to have the coupling stripped therefrom by the rear shoulder of said cavity.

13. In apparatus for welding and tapering pipe couplings or sockets, the combination with a mandrel having a straight and a tapered portion on which the coupling is welded and simultaneously tapered internally at one end, of dies having suitably-shaped cavities for welding and shaping the coupling on said mandrel, and an arm or bracket secured to the die and having its end projecting into the die-cavity in position to have the end of the mandrel abut thereagainst to properly position the mandrel in the dies.

In testimony whereof I, the said PETER BOYD, have hereunto set my hand.

PETER BOYD.

Witnesses:
ROBERT C. TOTTEN,
F. W. WINTER.